US006957007B2

(12) United States Patent
Balch et al.

(10) Patent No.: US 6,957,007 B2
(45) Date of Patent: Oct. 18, 2005

(54) METHOD AND APPARATUS FOR FABRICATING WAVEGUIDES AND WAVEGUIDES FABRICATED THEREFROM

(75) Inventors: Ernest Wayne Balch, Nisakyuna, NY (US); Leonard Richard Douglas, Burnt Hills, NY (US); Min-Yi Shih, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 272 days.

(21) Appl. No.: 10/064,581

(22) Filed: Jul. 29, 2002

(65) Prior Publication Data

US 2004/0017974 A1   Jan. 29, 2004

(51) Int. Cl.[7] .............................. G02B 6/00; G03C 5/00; G06F 19/00
(52) U.S. Cl. ...................... 385/147; 430/321; 700/120
(58) Field of Search ..................... 385/14, 129–132, 385/147; 430/321–326; 700/117–121

(56) References Cited

U.S. PATENT DOCUMENTS

| | | | |
|---|---|---|---|
| 5,525,190 A | 6/1996 | Wojnarowski et al. ...... 385/133 |
| 5,562,838 A | 10/1996 | Wojnarowski et al. ........ 216/24 |
| 5,737,458 A | 4/1998 | Wojnarowski et al. ........ 385/15 |
| 6,130,013 A * | 10/2000 | King ........................... 430/14 |
| 6,160,927 A | 12/2000 | Leclerc et al. ................ 385/14 |
| 6,272,271 B1 | 8/2001 | Wojnarowski et al. ........ 385/52 |
| 6,306,563 B1 | 10/2001 | Xu et al. ..................... 430/321 |
| 6,603,892 B1 * | 8/2003 | Ticknor ........................ 385/14 |
| 6,639,735 B2 * | 10/2003 | Park et al. ................... 359/741 |
| 6,826,345 B1 * | 11/2004 | Zhong et al. ............... 385/129 |
| 6,895,133 B1 * | 5/2005 | Calkins et al. ................ 385/14 |
| 2002/0012506 A1 | 1/2002 | Iizuka ......................... 385/91 |
| 2002/0019305 A1 | 2/2002 | Wu |
| 2004/0114900 A1 * | 6/2004 | Pan et al. ................... 385/129 |

OTHER PUBLICATIONS

R. Krchnaek, et al "Laser Direct Writing of Channel Waveguides Using Spin-On Polymers", J. Appl. Phys. 66 (11), Dec. 1989, pp. 5156-5160.

* cited by examiner

*Primary Examiner*—John D. Lee
(74) *Attorney, Agent, or Firm*—Ann M. Agosti; Patrick K. Patnode (57) ABSTRACT

A method for adaptively fabricating a waveguide comprises: measuring misplacement of a photonic device relative to a substrate; generating computer readable instructions for using a plurality of graphics primitives to form the waveguide; and photocomposing the waveguide on the substrate in accordance with the computer readable instructions. A reticle comprises a plurality of graphics primitives with at least one of the plurality of graphics primitives comprising a tapered end. A waveguide comprises a plurality of waveguide segments with each of the plurality of waveguide segments comprising a tapered end and being adjacent to at least one other of the plurality of waveguide segments.

40 Claims, 13 Drawing Sheets

METHOD AND APPARATUS FOR FABRICATING WAVEGUIDES AND WAVEGUIDES FABRICATED THEREFROM

BACKGROUND OF INVENTION

Waveguides can be fabricated with polymers or inorganic materials using lithographic techniques wherein a mask is aligned and a photosensitive material is exposed. In such techniques, if several optical devices are to be coupled by a single mode waveguide, the location of the devices must be accurate to submicron tolerances.

For example, in one commonly used method for actively aligning VCSELs (vertical cavity surface emitting lasers) to fiber optics, a VCSEL chip is aligned to a waveguide while monitoring the output of the waveguide. More than half of a typical photonic module assembly cost is incurred during such active alignment processes.

It would therefore be desirable to have a capability for adapting a waveguide to device locations and thereby relaxing the positioning tolerances of device locations during manufacturing. It would additionally be useful to have a less expensive fabrication technique which permits a VCSEL chip and detectors to be fixed in position prior to alignment.

SUMMARY OF INVENTION

Briefly, in accordance with one embodiment of the present invention, a method for adaptively fabricating a waveguide comprises: measuring misplacement of a photonic device relative to a substrate; generating computer readable instructions for using a plurality of graphics primitives to form the waveguide; and photocomposing the waveguide on the substrate in accordance with the computer readable instructions.

In accordance with another embodiment of the present invention, a computer-readable medium stores computer commands for commanding a computer system to formulate computer readable instructions for using a plurality of graphics primitives to form a waveguide. In this embodiment, the computer commands comprise: accessing an align file comprising data describing an actual position of a photonic device on a substrate; accessing a CAD (computer aided design) flash file comprising data describing an ideal placement of graphics primitives on the substrate; accessing a reticle index comprising a plurality of reticle files, each reticle file comprising a list of available graphics primitives on a respective reticle; accessing an adaption type file comprising data on reticle overlapping for positional offset error of the photonic device; and using the align file, the CAD flash file, reticle index, and the adaption type file to provide computer readable instructions for selecting a reticle and controlling a wafer stepper supporting the reticle and a light source positioned opposite the reticle for supplying light through the reticle to the substrate.

In accordance with another embodiment of the present invention, a reticle comprises a plurality of graphics primitives, at least one of the plurality of graphics primitives comprising a tapered end.

In accordance with another embodiment of the present invention a method for fabricating a waveguide comprises: selecting a reticle comprising a plurality of graphics primitives, at least one of the plurality of graphics primitives comprising a tapered end; using computer readable instructions for photocomposing the waveguide through selected graphics primitives of the reticle, the computer readable instructions comprising instructions designed to ensure that, for each of at least some pairs of adjacent photocomposed waveguide segments, at least one tapered end of one waveguide segment overlaps an adjacent end of the other waveguide segment.

In accordance with another embodiment of the present invention, a waveguide comprises a plurality of waveguide segments, each of the plurality of waveguide segments comprising a tapered end and being adjacent to at least one other of the plurality of waveguide segments.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
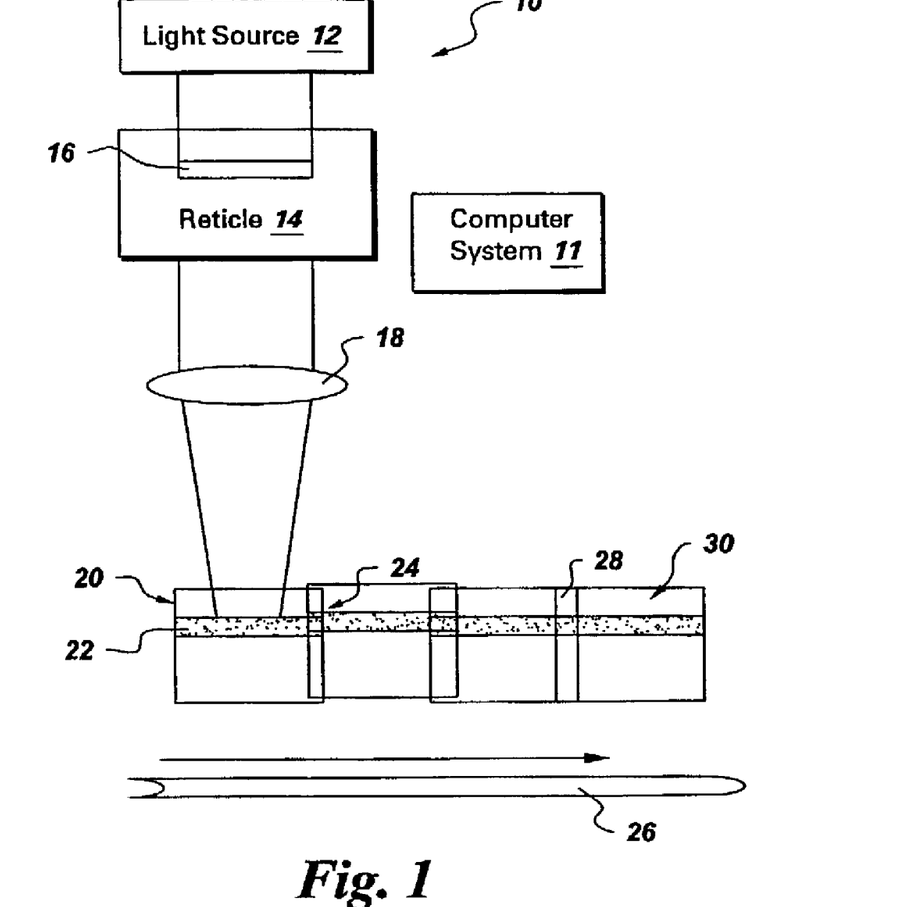
FIG. 1 illustrates a waveguide fabrication system for use in accordance with one embodiment of the present invention.
Figure 2:
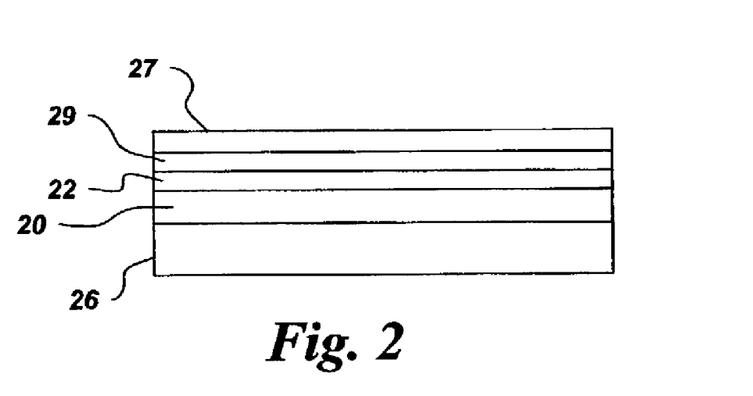
FIG. 2 is a side view of several of layers of material for optional use in the embodiment of FIG. 1.

FIG. 1 illustrates a waveguide fabrication system 10 for use in accordance with one embodiment of the present invention, and FIG. 2 is a side view of several of layers of material for optional use in the embodiment of FIG. 1.

In accordance with one embodiment of the present invention, a method for adaptively fabricating a waveguide 30 (meaning "at least one waveguide") comprises measuring misplacement of a photonic device 31, 32, 34 (shown in FIGS. 5–9, and meaning "at least one photonic device") relative to a substrate 20, generating computer readable instructions for using a plurality of graphics primitives 16 to form waveguide 30 by applying the misplacement measurements, and photocomposing the waveguide on the substrate in accordance with the computer readable instructions.

Typically waveguide 30 comprises an organic material such as a polymer, for example, or an inorganic material such as deposited glass or semiconductor material, for example, and has a thickness on the order of about two micrometers to about fifty micrometers, depending on the selected material and the number of layers. Due to the thin nature of waveguide 30, to prevent roughness in substrate 20 from causing reflections of light through waveguide 30, substrate 20 typically comprises a substantially flat substrate. "Substantially flat" is used herein to mean being similar in flatness to a polished silicon wafer. In one embodiment substrate 30 further comprises a stable low expansion material (that is, having a coefficient of thermal expansion on the order of about 4 ppm/degree C. (parts per million per degree centigrade)). One example material for the substrate is polished quartz.

Examples of photonic devices 31 include vertical cavity surface emitting lasers (VCSELs) 32 and photodetectors 34. VCSELs, when used, are typically positioned substantially flat and square with the surface of the waveguide. The present invention is not limited to but is particularly useful for single mode VCSELs used in communications requiring high quality signals and high data rates. In a more specific embodiment, a microlens 35 (FIG. 5) is provided over VCSEL 32 for focusing divergent light from the VCSEL.

Typically markings 21 (FIG. 6) are formed on substrate 20 prior to misplacement measuring, and photonic device 31 is measured relative to the markings. In one example, high contrast +'s are fabricated using conventional photolithography.

In one embodiment, measuring misplacement of photonic device 31 relative to substrate 20 comprises representing an actual position of photonic device 31 by a translational error. Translational error is typically represented as positional error in the X and the Y directions. Submicron measurement systems are commercially available from companies such as Visionary Systems, for example. In this embodiment, after the translational error is determined, the computer readable instructions are generated to compensate for the translational error of an embedded photonic device.

In some embodiments, the actual position of photonic device 31 is additionally represented by a rotational error, and the computer readable instructions compensate for both errors. Rotational error is typically represented as positional error in the theta direction and occurs if photonic device 31 is not square with the substrate. Ability to compensate for rotational error typically involves rotation between the substrate and the photocomposition apparatus (shown as light source 12, reticle 14, and focusing optics 18 in FIG. 1 for purposes of example). If such rotation is not desired, another option is to represent an actual position of an aperture itself or other point source of the photonic device by the translational error.

Typically the generation of computer readable instructions comprises identifying a reticle 14 (meaning "at least one reticle") for use during photocomposition. The reticle is used to provide a waveguide segment 22 which is either the same size as a graphics primitive 16 (these reticles are often referred to as "masks" or 1× reticles) or which is a different size than the graphics primitive. In one embodiment the different size is reduction factor of about five, for example. Graphics primitive may either comprise an opening or a reduction in thickness or opaqueness sufficient to permit a desired amount of light to pass therethrough, or combinations of openings and reductions in thicknesses.

In one embodiment, the different size of the waveguide segment as compared to the graphics primitive is a reduction factor of about five. In a more specific embodiment, reticle 14 comprises a square having sides of about 127 mm which in turn includes an inner active area (an area including graphics primitives) comprising a square having sides of about 50 mm which translates into an area of exposure of a square having sides of about 10 mm for a 5× reduction factor embodiment. In one example a graphics primitive has a length ranging from about 7 mm to about 10 mm, a height less than or equal to about 50 micrometers, and a width about 5 micrometers, and is spaced apart from adjacent primitives by about 1 mm.

Figure 3:
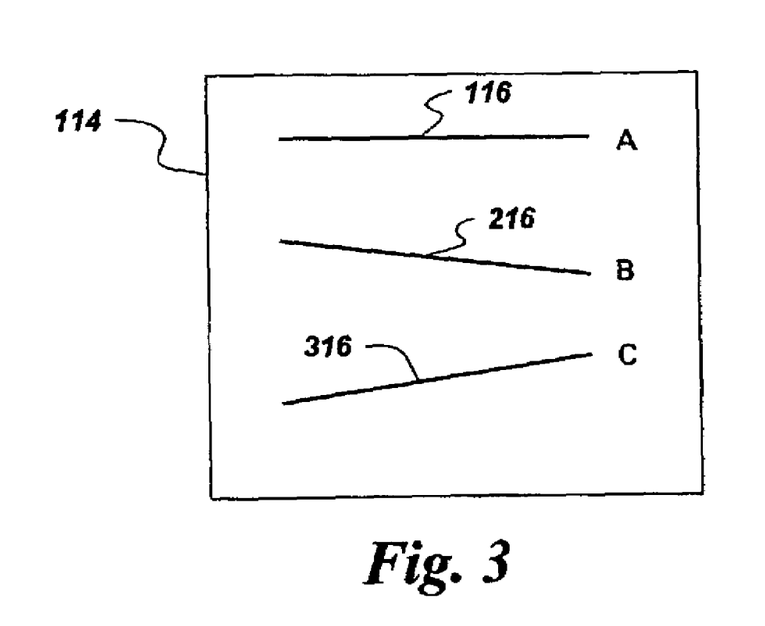
FIG. 3 is a top view of a reticle comprising a plurality of graphics primitives.
Figure 4:
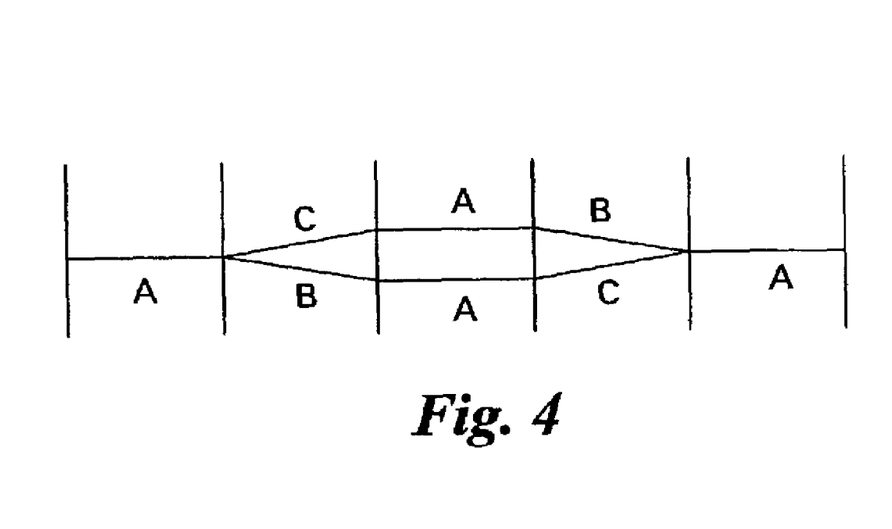
FIG. 4 is an example top view of a waveguide Mach-Zender interferometer device fabricated using the graphics primitives of the reticle of FIG. 3.

FIG. 3 is a top view of a reticle 114 comprising a plurality of graphics primitives 116, 216, and 316, and FIG. 4 is an example top view of waveguide 30 Mach-Zender interferometer device fabricated using graphics primitives 116, 216, and 316 of the reticle of FIG. 3. Although three graphics primitives are shown for purposes of example, the larger the number of graphics primitives, the greater the flexibility in waveguide design and adaptation. In one embodiment, generation of the computer readable instructions includes determining optimal graphics primitives and using the optimal graphics primitives for identifying the reticle. FIG. 4 is shown as having a split waveguide for purposes of example only. In some applications the split assists in spatial modulation.

Typical embodiments wherein VCSELs are used include mirrors (typically 45 degree mirrors, for example) for reflecting light from the VCSEL to the overlying waveguide.

Figure 5:
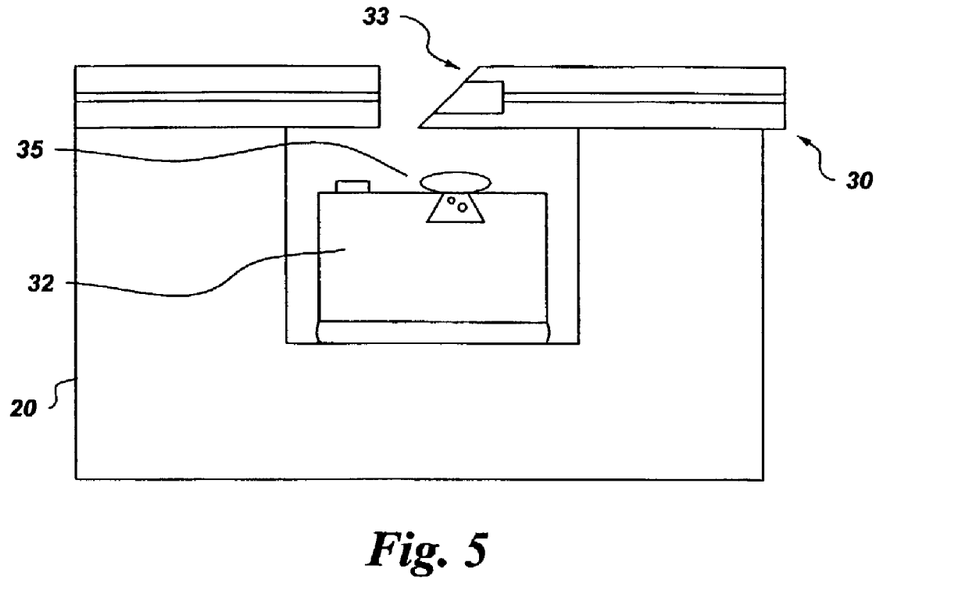
FIG. 5 is a sectional side view illustrating a waveguide end point fabricated in accordance with one embodiment of the present invention.

FIG. 5 is a sectional side view illustrating a waveguide end point fabricated in accordance with one embodiment of the present invention wherein the generation of the computer readable instructions comprises generating the computer readable instructions for using the plurality of graphics primitives to form a waveguide having profiled end points 33. In this embodiment, the reticle which is used to generate the profiled end points comprises a grayscale reticle (sometimes referred to as a binary halftone mask). By using a grayscale reticle, a desired angle (typically but not necessarily about 45 degrees) can be fabricated simultaneously with the respective waveguide segment The slope of the angle can be formed and adjusted by changing the transmittance of the graphic primitive (shown as element 2216 in FIG. 25 for example). For minimizing light divergence, it is useful if VCSEL 32 is within about 12 um (Z direction) of the reflection point of the angle and more preferably within about 10 micrometers.

In some embodiments wherein edge emitting laser diodes (not shown) are used, such profiled end points at the end of the waveguide closest to the photonic devices are typically not used. In these embodiments, the laser aperture is designed to be level on the same plane as the waveguide and aligned with the waveguide.

In one embodiment, the photocomposition comprises using a wafer stepper 26 (FIG. 1). In a more specific embodiment of the present invention, the reticle is maintained in a stationary position and the wafer stepper is used for moving the substrate in pre-set positions. In this embodiment, light source 12 (FIG. 1) typically stays stationary, and reticle edge masking via masking blades (not shown) is used to cover and uncover reticles, and a shutter mechanism (not shown) controls the light from light source 12. It is additionally advantageous to modify stepper software to provide more flexibility in positioning when moving the substrate as directed by computer instructions.

The mechanics of the photocomposition may take any one of several convenient forms. In one embodiment, for example, a photoresist 27 (FIG. 2) is provided over the material of waveguide 30, photoresist 27 is exposed to light through reticle 16, and photoresist 27 is then used to pattern the waveguide 30. In this embodiment, using the photoresist to pattern the waveguide is typically accomplished by dry etching both the photoresist and waveguide. More specifically, in a grayscale reticle embodiment, the grayscale portion of the reticle is used to etch partially through the photoresist in the area where the profiled endpoint 33 (FIG. 5) of the waveguide is to be formed. The dry etch then etches through both the photoresist and the waveguide. Typically the materials are selected such that the etch occurs at a substantially similar rate. One example etching technique is reactive ion etching. For this technique, thick, low contrast processed photoresists, such as AZ 4660™ photoresist (AZ is a trademark of Hoechst Celanese Corporation), are particularly useful.

In a related embodiment, in addition to the photoresist, a metallization layer 29 is used. In this embodiment, metallization layer 29 is provided between the material of waveguide 30 and the photoresist. After exposing photoresist 27 to light through reticle 14, metallization layer 29 is wet etched to create a metallization layer mask. In this embodiment, the metallization layer comprises a material which can be wet etched without harming the underlying waveguide. In one embodiment, for example, the metallization layer comprises nickel, and the waveguide material comprises a polymer such as a poly(methyl methacrylate) or a polyetherimide. The waveguide is then dry etched through the metallization layer. During the dry etching, the metallization layer protects the underlying waveguide (but does not permit simultaneous fabrication of angled endpoints 33). Finally, metallization layer 29 is removed.

In still another photocomposition embodiment, the waveguide is formed by exposing the waveguide to light through the reticle. In this embodiment, the waveguide is exposed to light through the reticle, developed, and then fixed. Particularly useful materials for this embodiment include photopolymerizable monomers, oligomers, or polymers such as described in Xu et al., U.S. Pat. No. 6,306,563, for example. When the material is exposed to light (a process which is sometimes referred to as "photobleaching" or direct photocomposition), the index of refraction changes and the desired waveguide results. The non-exposed material can either be removed or left in place.

Figure 6:
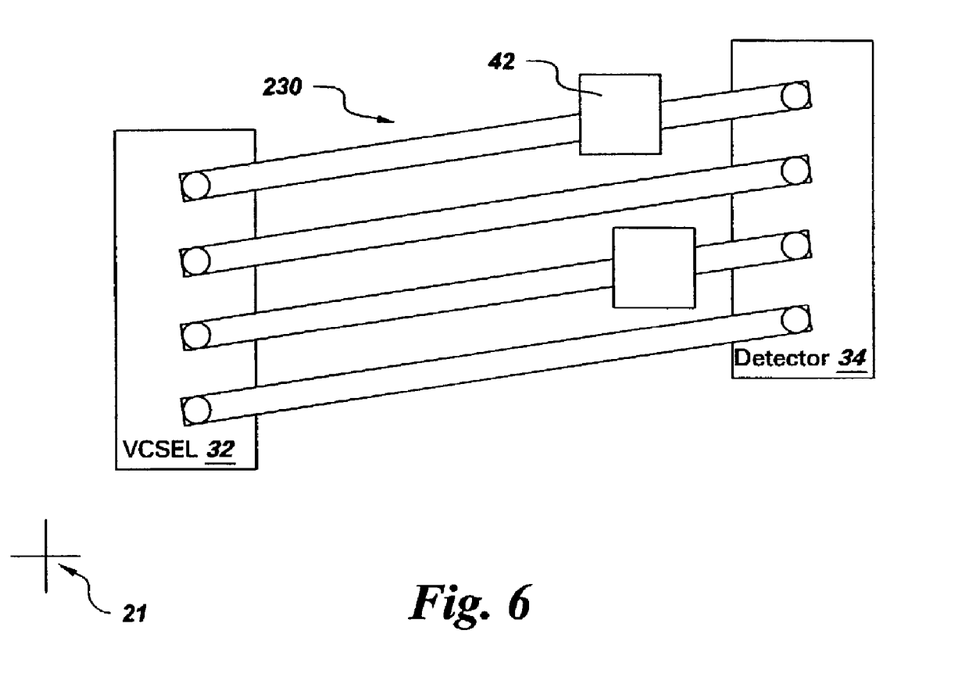
FIGS. 6–9 are top views of waveguides fabricated in accordance with several embodiments of the present invention.
Figure 7:
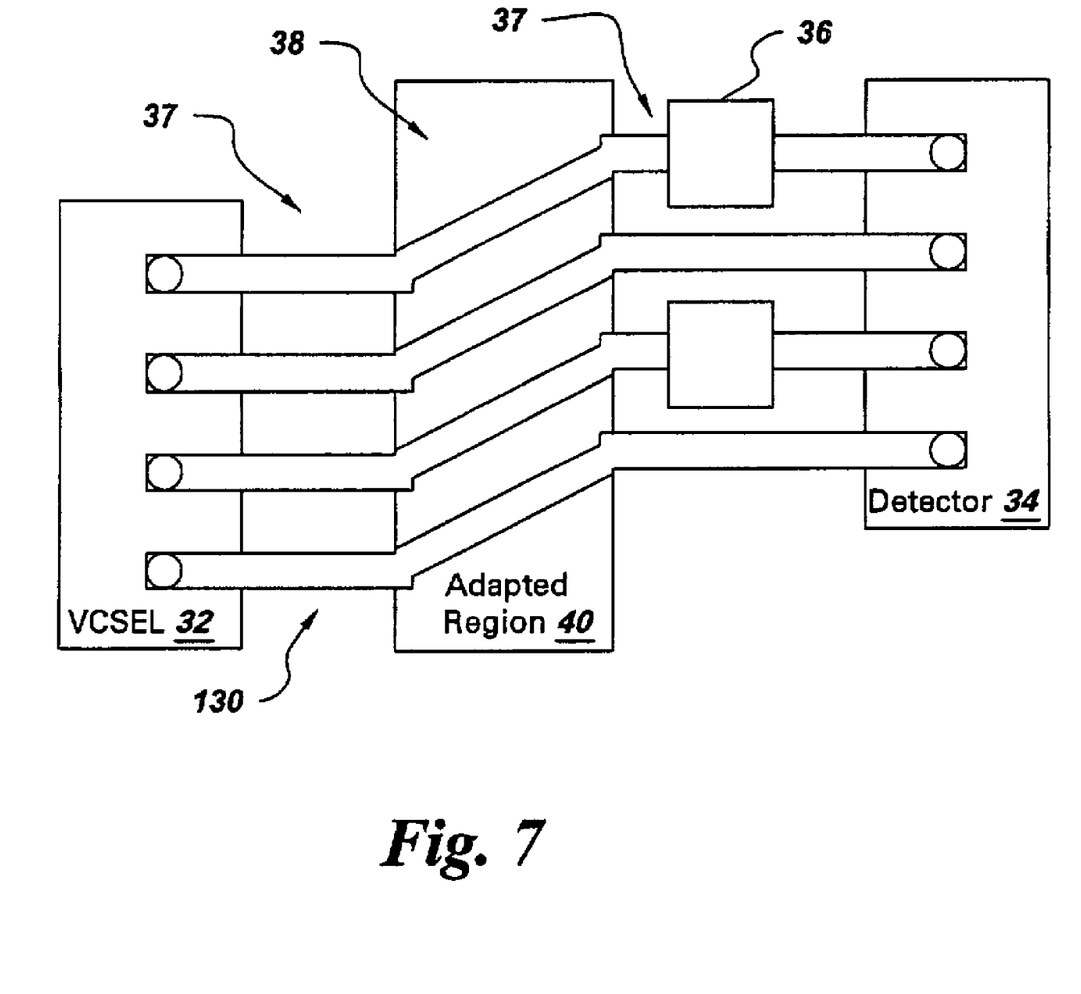

FIGS. 6 and 7 are top views of waveguides 230 and 130 fabricated in accordance with several embodiments of the present invention. For purposes of illustration, individual waveguide segments 22 (FIG. 1) are not shown. In these embodiments the photonic devices comprise a VCSEL 32 and a photodetector 34. FIGS. 6 and 7 additionally illustrate the optional use of adapted and non-adapted active devices 42 and 36. Overlying a waveguide with an active device such as a metallization layer coupled to a current source is useful when light modulation is desired.

In the embodiment of FIG. 6, the generation of computer readable instructions comprises generating computer readable instructions for fabricating a substantially straight waveguide 230 that is adapted over the entire distance between VCSEL 32 and detector 34. "Substantially straight" as used herein means that the waveguide is patterned to travel from one location to another location approximately along the shortest distance. In practice, mild curves and jogs will occur when aligning waveguide segments (not shown), and, thus, the resulting waveguide will not be perfectly straight.

In contrast to the embodiment of FIG. 6, the embodiment of FIG. 7 is one in which the computer readable instructions are for fabricating a waveguide comprising an adapted portion 38. More specifically, the embodiment of FIG. 7 illustrates a waveguide comprising two substantially straight portions 37 coupled by the adapted portion 38. In the embodiment of FIG. 6, wherein the adaption is "complete," less of an angle exists at connection joints between waveguide segments as compared with the adapted region 40 of the embodiment of FIG. 7 ("partial" adaptation), however, there is a greater challenge when aligning (squaring) the photonic devices with the waveguides. The larger the size of adapted region 40, the more flexibility for minimizing angles (and thus coupling loss) between the straight and adapted portions.

Figure 8:
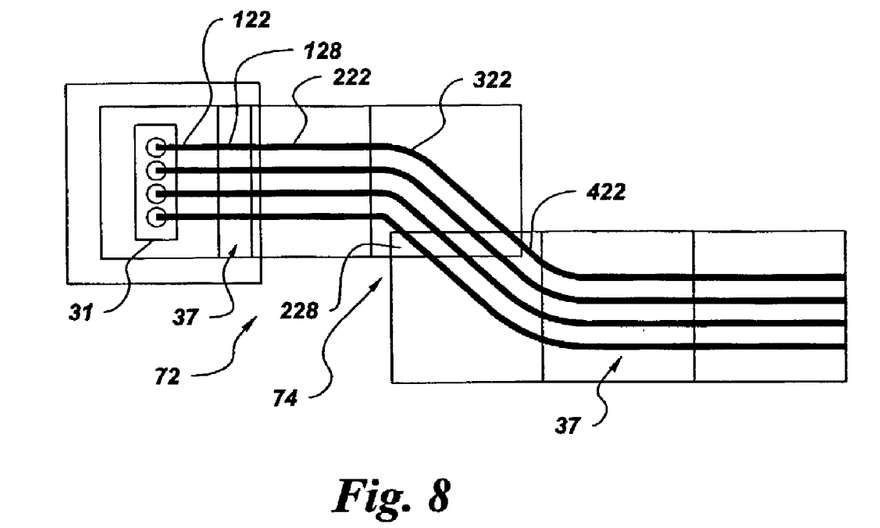
Figure 9:
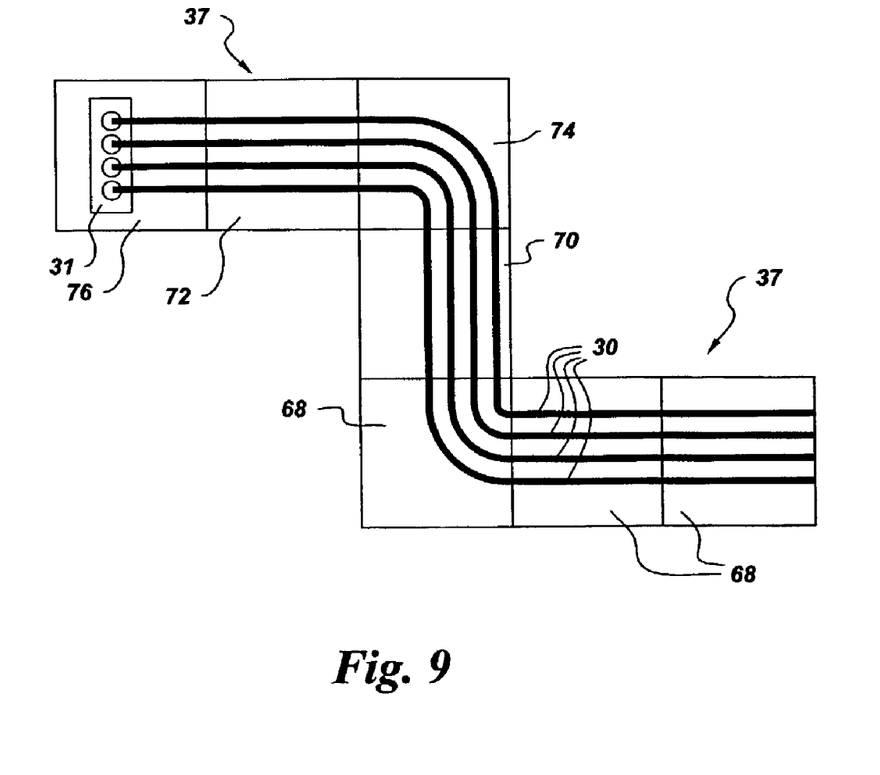

In the embodiments of FIGS. 6 and 7, the number of graphic primitives to interconnect the waveguides to the photonic device will depend on angles but is typically expected to be in the range of about 50 to about 100. FIGS. 8 and 9 are top views of waveguides fabricated in accordance with several other embodiments of the present invention which has the benefits of ease of waveguide alignment and reduction in the sharpness of angles resulting from adaptive portions.

The embodiments of FIGS. 8 and 9 build on the embodiment of FIG. 7. In these embodiments, the computer readable instructions of the method embodiment comprise instructions for fabricating a stretch region 70 or 72 in one (meaning "at least one") of the substantially straight portions 37. The photocomposed interconnect in stretch regions 72 and 70 (FIG. 9) is allowed to expand or contract in the respective X or Y direction based on the translational error of photonic device 31 due to the respective overlap of the primitives prior to the translational correction. This overlap bounds the maximum amount of translation that can be applied. One expansion example of is shown in FIG. 8 where the joint (overlap) 128 between waveguide segments 122 and 222 can be adjusted to change the length of the waveguide.

In the embodiment of FIG. 8, the adapted portion comprises a straight stretch region 72 and a translation bend region 174. Joint 228 between waveguide segments 322 and 422 can be adjusted so as to offset the translation bend region in both the X and Y directions. Although one translational bend region is shown for purposes of example, multiple translational bend regions may be used. Furthermore, in some embodiments, the bend regions are not adaptive. The amount of bend shown in the transition bend regions of FIGS. 8 and 9 is somewhat exaggerated for purposes of illustration. The gentler the bend, the less the losses in light transmission.

In one embodiment, specific regions are established in the waveguide design prior to measuring misplacement and generating the computer readable instructions. In one specific approach, as shown in FIG. 9, five regions are designated: (1) unadapted waveguide region 76, (2) X stretch region 72, (3) Y stretch region 70, (4) X,Y translation bend region 74, and (5) X,Y translation connection region 68. The design is then photocomposed in the unadapted regions 76 and 68 using traditional masking, and the offset is performed in the bend and stretch regions 72, 74, and 70 based on the photonic device position. The number of needed graphic primitives can be reduced because the graphics primitives in the non-offset regions are fixed. The turn radius in the bend regions will depend upon the index of refraction, but, generally, the larger the turn radius, the smoother the transition. In one embodiment the turn radius is in the millimeter to centimeter range.

Figure 10:
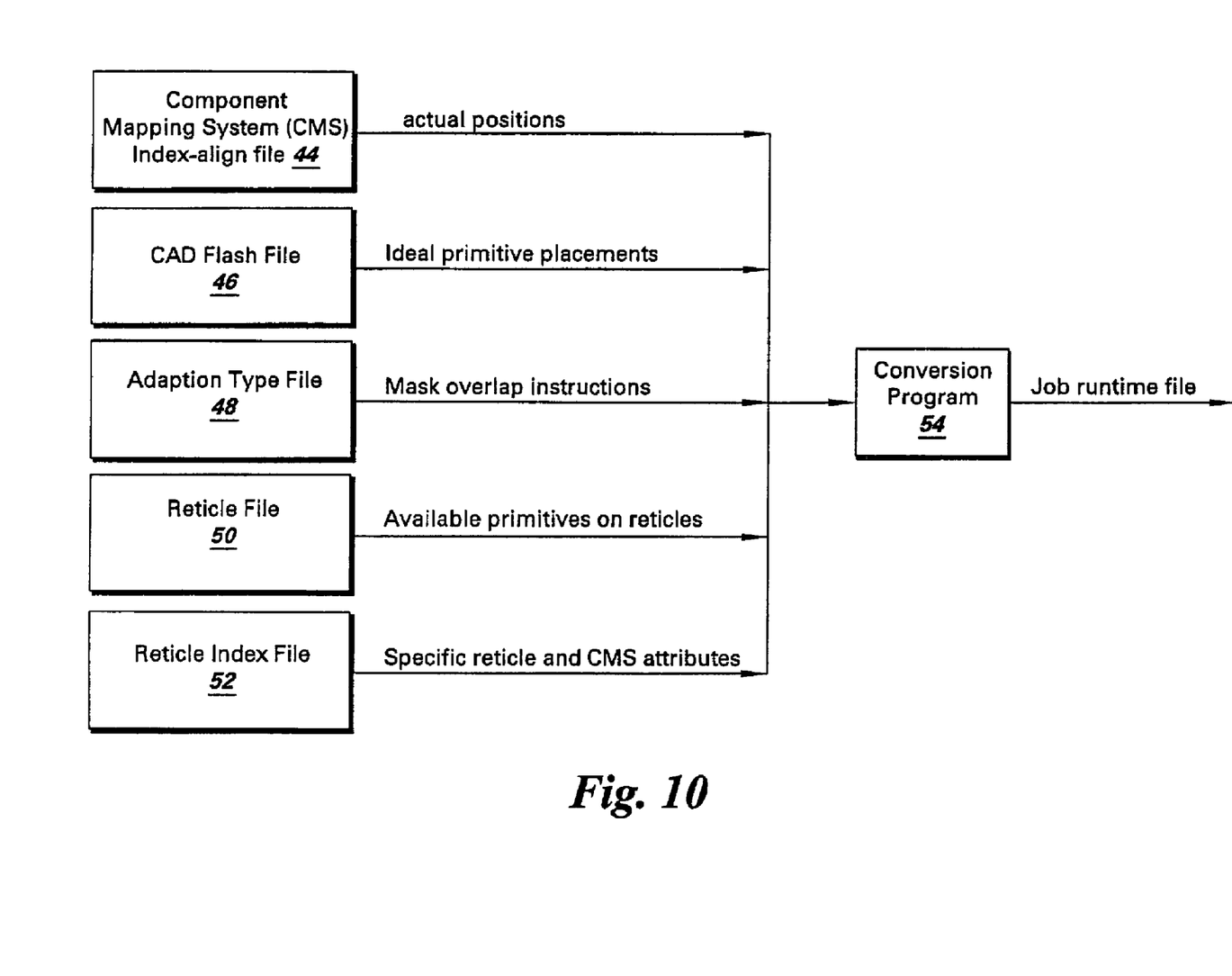
FIG. 10 is a block diagram illustrating computer files in accordance with one embodiment of the present invention.

FIG. 10 is a block diagram illustrating computer files in accordance with one embodiment of the present invention. In the embodiment of FIG. 10, a computer-readable medium storing computer commands for commanding a computer system 11 (FIG. 1) to formulate computer readable instructions for using a plurality of graphics primitives 16 to form a waveguide 30 comprises accessing an align file 44 comprising data describing an actual position of a photonic device on a substrate, accessing a CAD (computer aided design) flash file 46 comprising data describing an ideal placement of graphics primitives on the substrate, accessing a reticle index 52 comprising a plurality of reticle files 50, each reticle file comprising a list of available graphics primitives on a respective reticle, accessing an adaption type file 48 comprising data on reticle overlapping for positional offset error of the photonic device, and, within a conversion program 54, using the align file, the CAD flash file, the reticle index file, and the adaption type file to provide computer readable instructions for selecting reticle 14 (meaning "at least one") and controlling wafer stepper 26 supporting substrate 20 and light source 12 positioned opposite the reticle for supplying light through the reticle to the substrate (FIG. 1).

Computer system 11 may comprise, for example, one or more digital processors, analog processors, or combinations thereof. In one embodiment, the conversion program specifies wafer stepper exposure locations. As discussed above, flexibility is advantageous in using the wafer stepper for positioning the substrate.

In another embodiment, the conversion program specifies reticles to be used in wafer stepper passes. Each time a reticle is changed and new exposures are started, a new "pass" is considered as started. If all of the desired graphics primitives for one waveguide are situated on one reticle, one pass is adequate for waveguide fabrication. In one example embodiment, about 5 to about 10 graphics primitives are situated on each reticle.

Typically the conversion program further specifies exposure parameters for each of the waveguide segments. In one embodiment, the exposure parameters comprise positional coordinates and reticle opening offset. These parameters are used to direct the reticle edge masking blades (not shown) to block off all of the reticle except the desired portion that will be exposed. The positional coordinates are used to direct the reticle where to position the new X Y center of the masking blades. The reticle opening offset is used to control how wide the masking blades are opened. In a more specific embodiment, the exposure parameters further comprise exposure, focus, and reticle offset. In one example for using the parameters, substrate 20 is loaded into stepper 26, a job is set up on stepper 26, the stepper parameters are entered, a reticle is loaded for the job, the job software is loaded, and the substrate is aligned on the stepper.

If a pair of adjacent waveguide segments are not aligned (as shown by element 24 in FIG. 1, for example), light will reflect back and not all go in the intended direction. Two techniques can be used either separately or in combination to minimize waveguiding loss due to the reticle misalignment (sometimes referred to as stitching errors). One technique relates to the shaping of the ends of the graphics primitives, and the other technique relates to the profile (height or intensity distribution) of the reticle at the ends of the graphics primitives. Both techniques are designed for efficiently guiding the light energy (minimizing the losses) while permitting slightly looser controls and requirements of the alignment between a pair of waveguide segments.

In one embodiment of the present invention, a reticle comprises a plurality of graphics primitives, at least one of the plurality of graphics primitives comprising a tapered end (meaning "at least one"). As described below, by using graphics primitives with tapered ends, the effects of reticle misalignment on waveguide smoothness can be reduced. The taper may comprise a physical taper (such as in an embodiment wherein the waveguide is patterned by etching) or an index of refraction taper (such as in an embodiment wherein the waveguide is patterned by directly by the photocomposition).

FIGS. 12–24 are top views illustrating shaped tapers of graphics primitives 116 and 216 or corresponding waveguide segments 122 and 222 in accordance with several embodiments of the present invention primarily useful in bi-directional light flow (FIGS. 12–18) and uni-directional light flow (FIGS. 19–24). Because the shape is the same regardless of whether the graphics primitive or waveguide segment is being described, for simplicity of explanation, the figures are not duplicated for each category.

Figure 11:
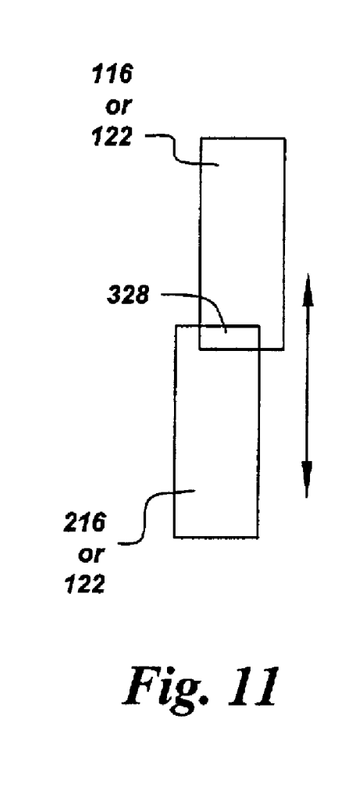
FIGS. 11–18 are top views illustrating shaped tapers of graphics primitives or corresponding waveguide segments in accordance with several embodiments of the present invention primarily useful in bi-directional light flow.

As used herein, "shaped taper" refers to the X Y plane of the graphics primitive or waveguide. In the embodiment of FIG. 11, a rectangular shape and with rectangular endpoints is shown with an overlapping joint 328. In contrast, in the embodiments of FIGS. 12–24, at least one endpoint of each pair has a shaped taper. In the example bi-directional embodiments of FIGS. 12–18, two endpoints of each pair have shaped tapers 78, 80, 82, 84, 86, 88, and 90. One shaped taper 188, 182, 180, 184, 190, is illustrated in the example unidirectional embodiments of FIGS. 19–23. Such distinctions are not required however. For example, two shaped tapers 182 and 92 are illustrated in the example uni-directional embodiment of FIG. 24. In the bi-directional examples, the shapes are selected to facilitate light transmission in both directions, whereas, in the uni-directional examples, the shapes are selected to concentrate light in one direction.

Figure 12:
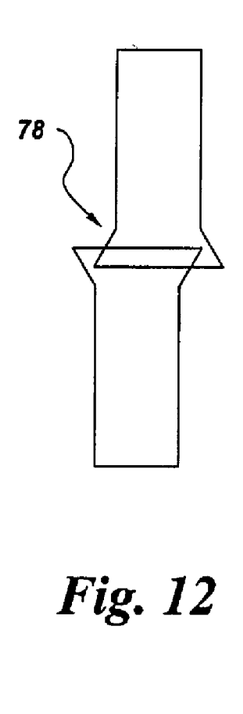
Figure 13:
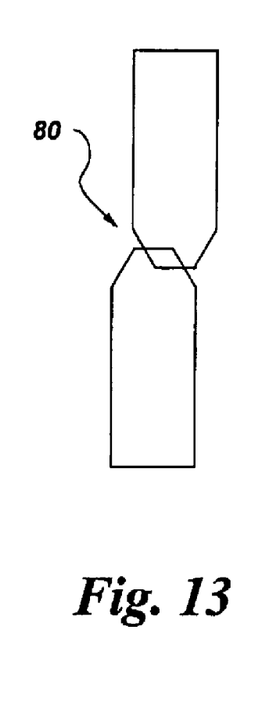
Figure 14:
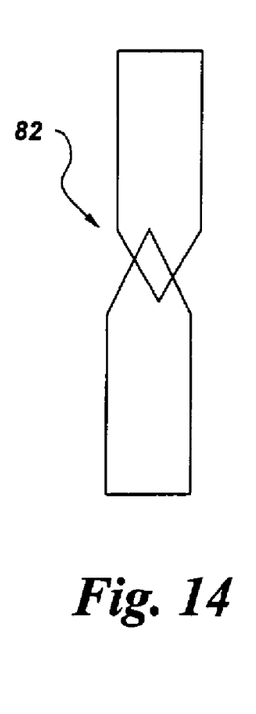
Figure 24:
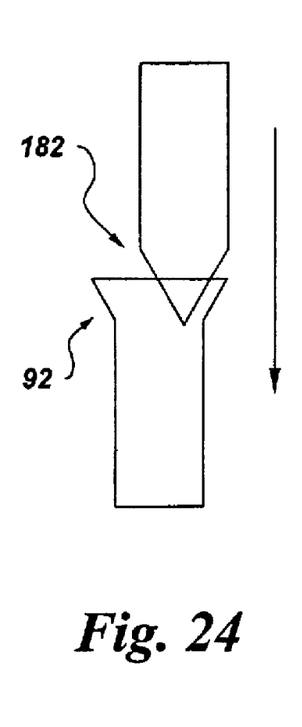

As shown by shaped taper 78 in FIG. 12 and shaped taper 92 in FIG. 24, in several embodiments the shaped taper comprises a widened taper. In other embodiments, the shaped taper comprises a narrowed taper as shown by shaped tapers 80, 82, 84, 86, 88, 90, 188, 182, 180, 184, 190, 182 in respective FIGS. 13, 14,15, 16, 17, 18,19, 20, 21, 22, 23, and 24.

Figure 15:
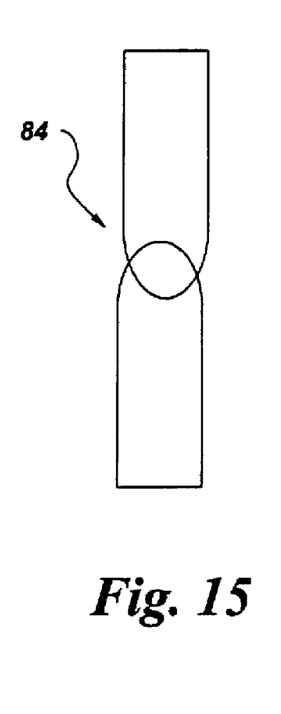
Figure 16:
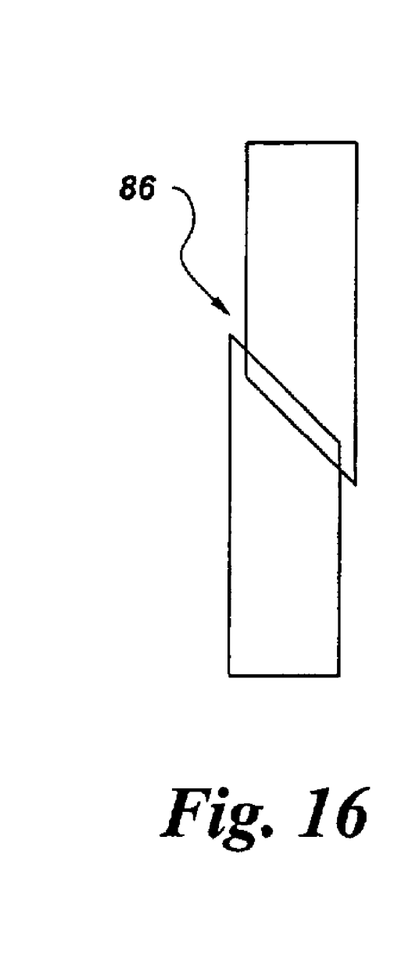
Figure 17:
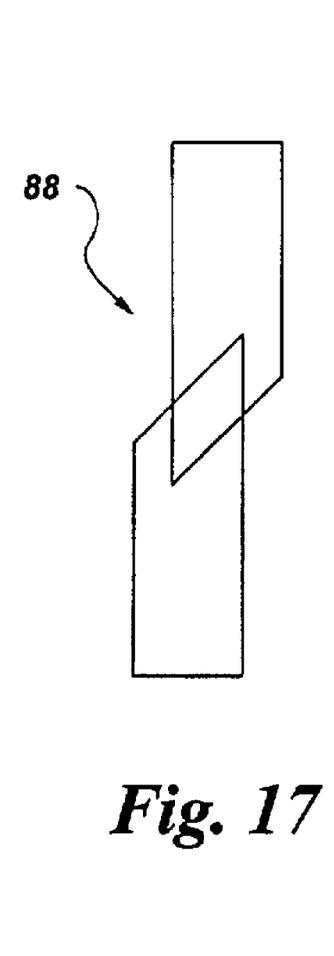
Figure 18:
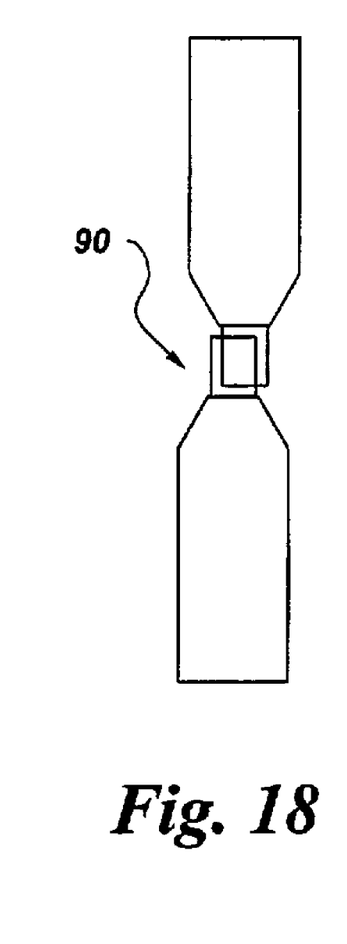
Figure 19:
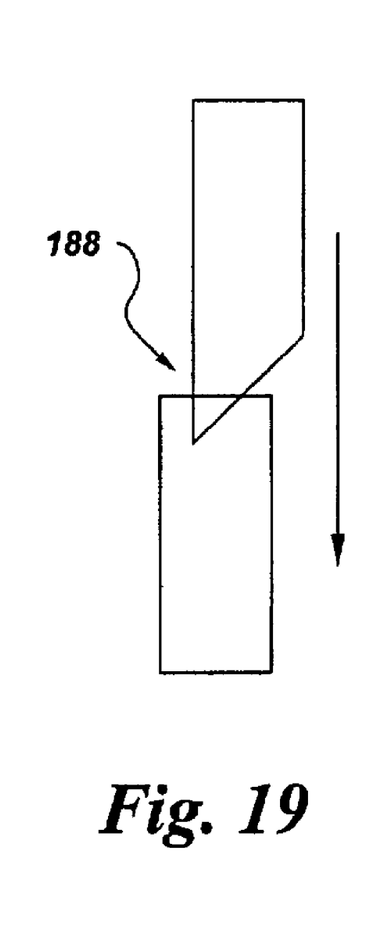
FIGS. 19–24 are top views illustrating shaped tapers of graphics primitives or corresponding waveguide segments in accordance with several embodiments of the present invention primarily useful in uni-directional light flow.
Figure 20:
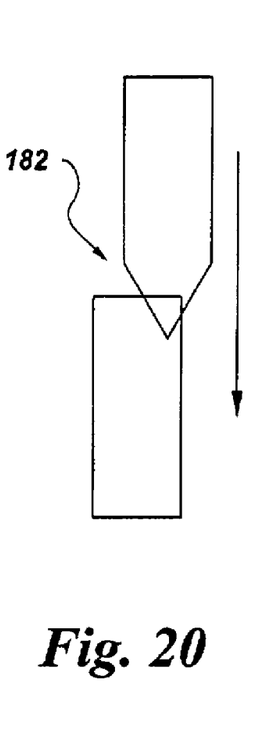
Figure 21:
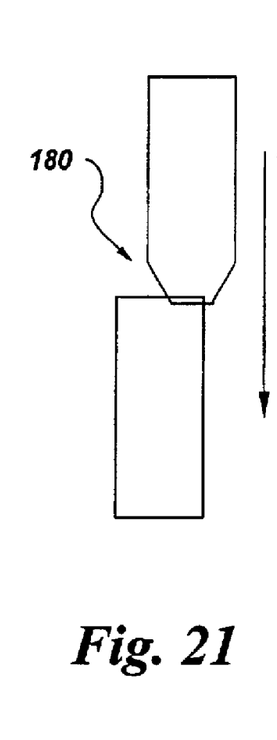
Figure 22:
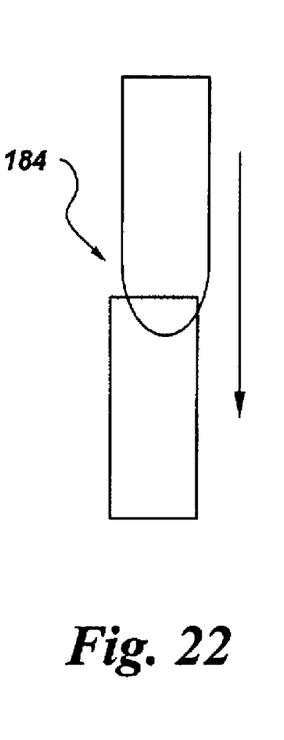
Figure 23:
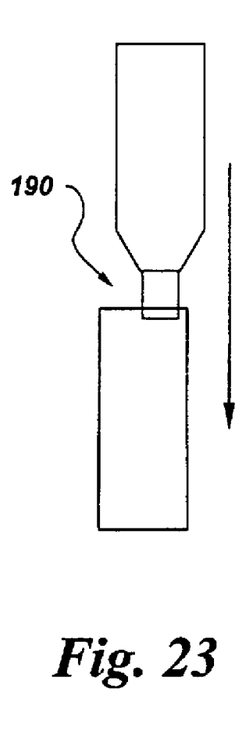

In some embodiments, the shaped taper comprises a rounded taper such as shown by taper 84 in FIG. 15 and taper 184 in FIG. 22. In some embodiments, the shaped taper comprises an angled taper as shown by taper 78 in FIG. 12, taper 80 in FIG. 13, and taper 82 in FIG. 14, for example. In other embodiments (not shown), combinations of rounded and angled tapers are present.

Figures 25, 26:
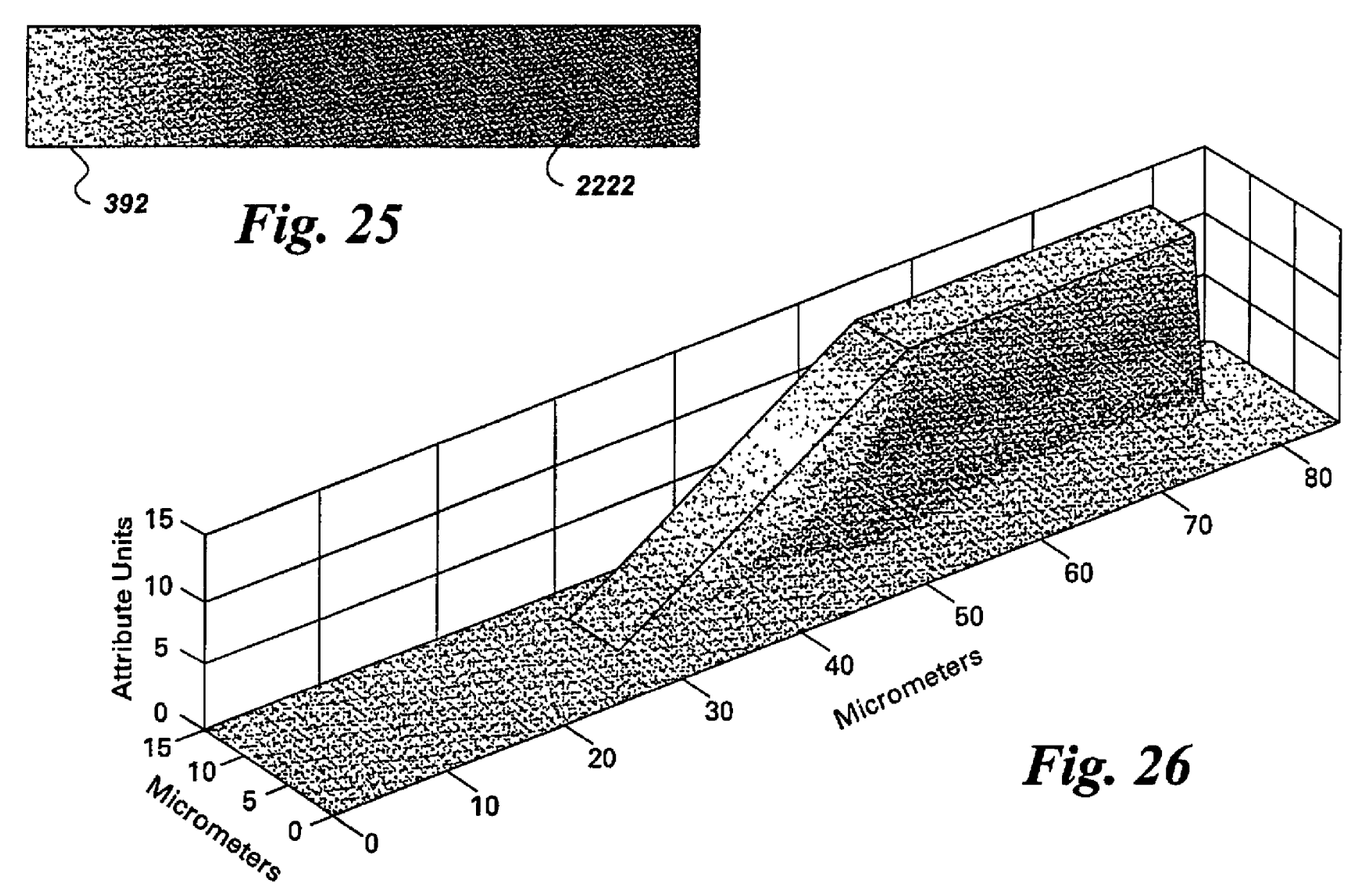
FIG. 25 is a top view of a profiled taper of a graphics primitive or corresponding waveguide segment in accordance with one embodiment of the present invention.
FIG. 26 is a perspective view of the profile of the waveguide segment of FIG. 25.
Figures 27, 28, 29:
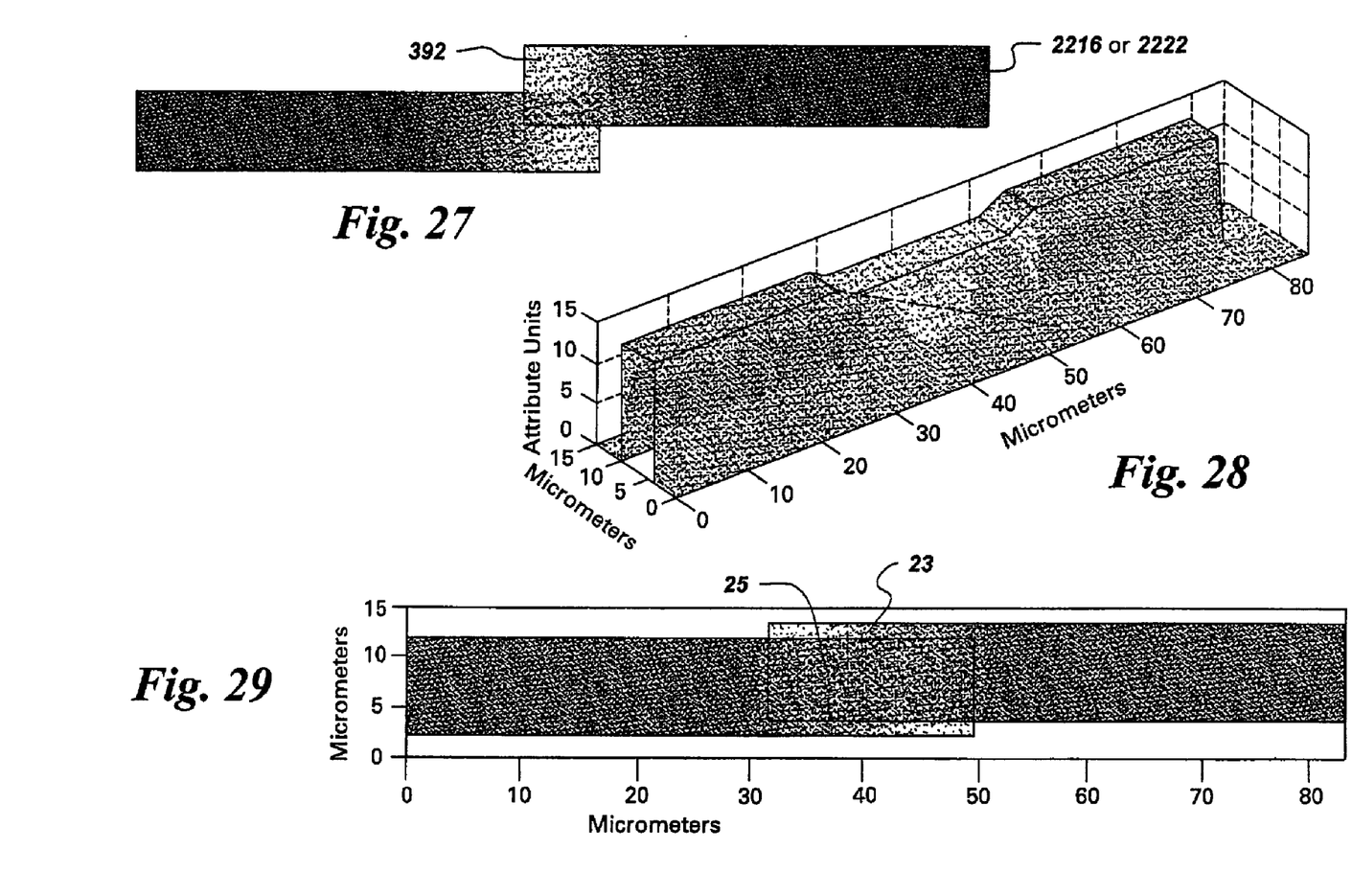
FIG. 27 is a top view of two graphics primitives or corresponding waveguide segments of the type shown in FIG. 25.
FIGS. 28 and 29 are respective perspective and top views of profiles of the waveguide segments of the type shown in FIG. 27.
Figure 30:
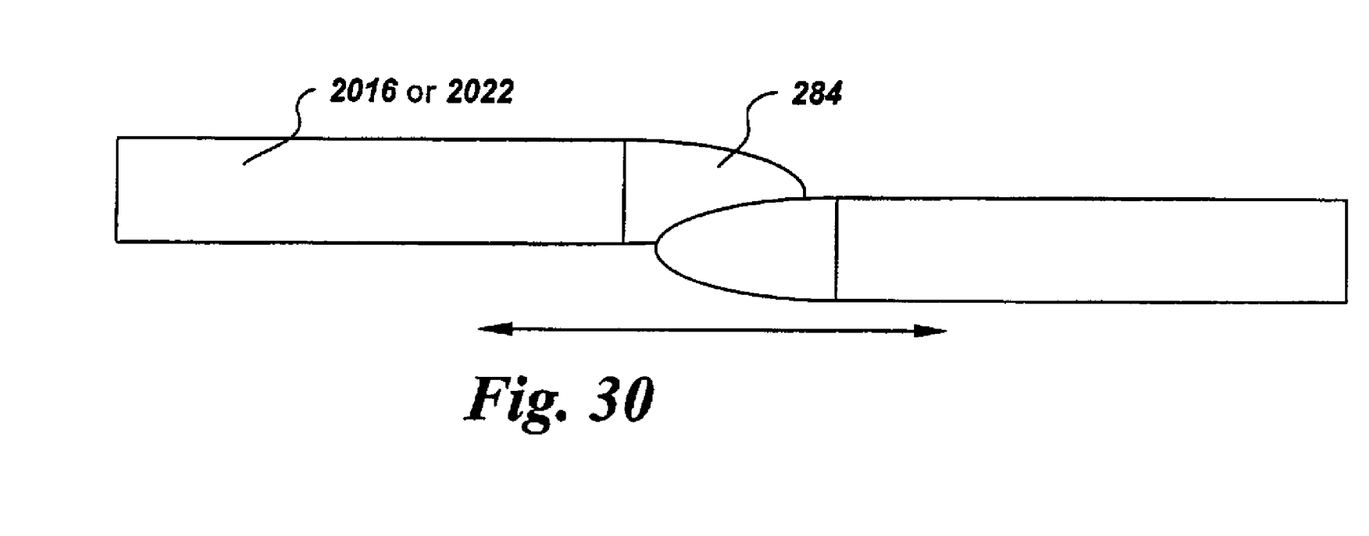
FIGS. 30–33 are top views of graphics primitives or corresponding waveguide segments in accordance with several embodiments of the present invention.
Figure 31:
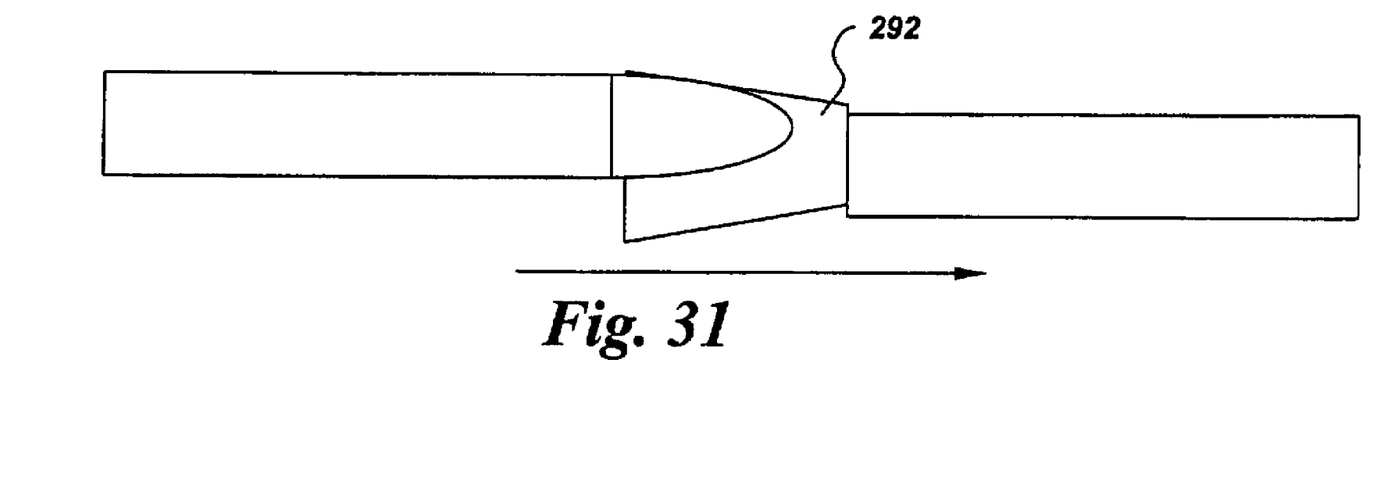
Figure 32:
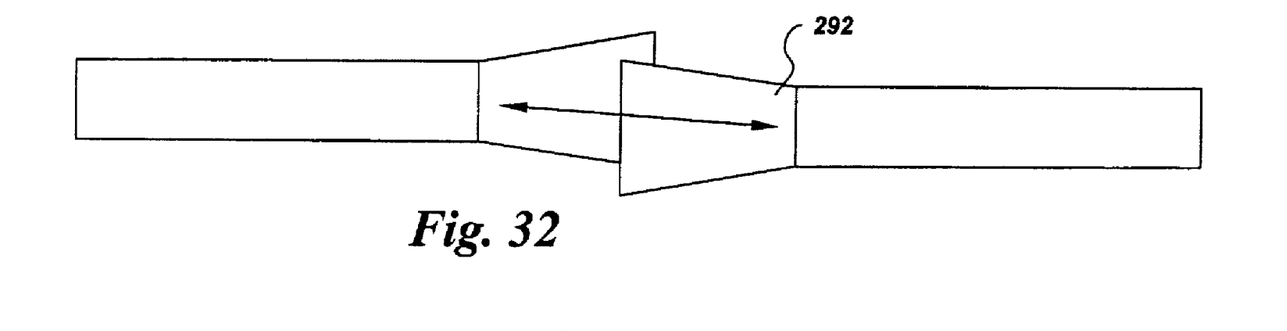
Figure 33:
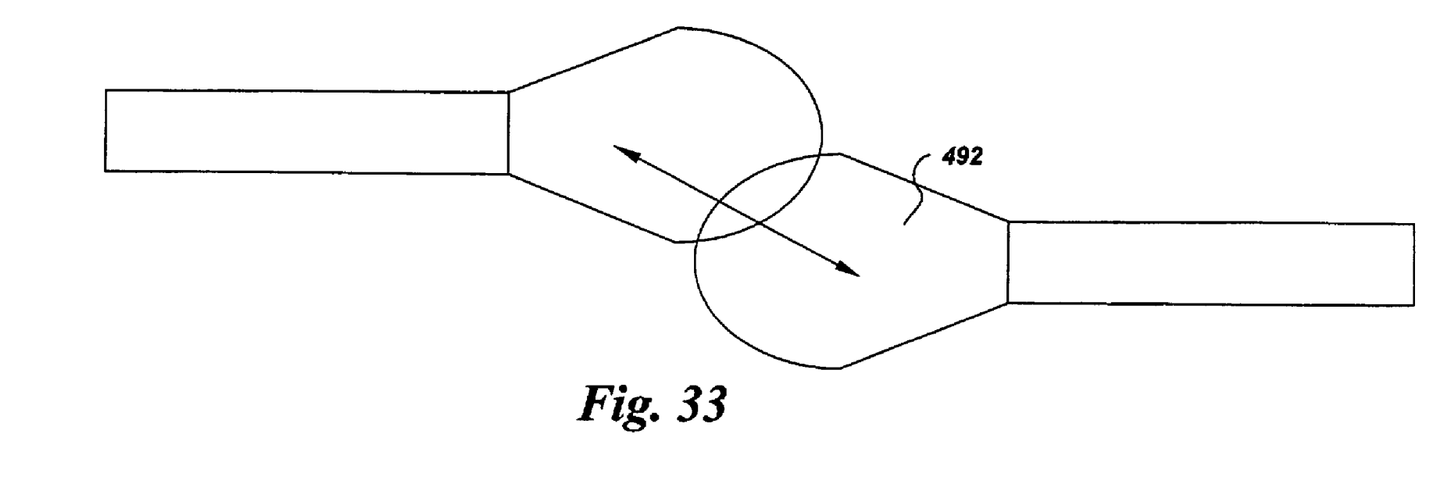

FIG. 25 is a top view of a profiled taper 392 of a graphics primitive 2216 or corresponding waveguide segment 2222 (more specifically, an intensity profile of a waveguide segment which results from applying a gray-scale mask technique) in accordance with one embodiment of the present invention, and FIG. 26 is a perspective view of an intensity profile of the waveguide segment of FIG. 25. FIG. 27 is a top view of two graphics primitives or corresponding waveguide segments of the type shown in FIG. 25, and FIGS. 28 and 29 are respective perspective and top views intensity profiles of the waveguide segments of the type shown in FIG. 27.

As used herein, "profiled taper" refers to a profile the Z plane of the graphics primitive or waveguide. With respect to the waveguide, as discussed above, the taper may comprise a physical taper or an index of refraction taper. Profiled taper 392 can be fabricated in a similar fashion as discussed above with respect to FIG. 5.

By using grayscale reticles, self-alignment between overlapping waveguide segments can be facilitated. The gray scale is used to reduce the patterning by about 50 percent, and higher waveguide thickness in the middle region 25 as compared with the side regions 23 as can be most readily seen by FIGS. 28 and 29 which illustrate two waveguide segments fabricated by graphics primitives with profiled tapers. Additional benefits of profiled tapers are that double exposure (of either the photoresist or the waveguide, depending upon the photocomposition embodiment) at the waveguide joints can be reduced and a smoother transition between waveguide segments can be provided.

In other additional or alternative embodiments, the taper comprises a shaped and profiled taper 284, 292, or 492 as shown by FIGS. 30–33 which are top views of graphics primitives 2016 or corresponding profiles of waveguide segments 2022.

The desired angles of profiles in profiled taper embodiments and shaped and profiled taper embodiments will vary depending upon the shapes of the waveguide segment end points and the length of joint overlap between the waveguide segments. The graphics primitives are selected to have angles resulting in a sufficient waveguide profile in each joint without significant double exposure.

In another embodiment, a method for fabricating a waveguide 30 (meaning "at least one") comprises selecting a reticle 14 comprising a plurality of graphics primitives 16, at least one of the plurality of graphics primitives comprising a tapered end (meaning "at least one"), using computer readable instructions for photocomposing the waveguide through selected graphics primitives of the reticle, the computer readable instructions comprising instructions designed to ensure that, for each of at least some pairs of adjacent photocomposed waveguide segments, at least one tapered end of one waveguide segment overlaps an adjacent end of the other waveguide segment. In this embodiment, "adjacent" is used in the sense that each waveguide segment pair comprises overlapping waveguide segments.

In a more specific related embodiment, the waveguide comprises a bi-directional waveguide and the computer readable instructions comprise instructions designed to ensure that, for each of at least some pairs of adjacent photocomposed waveguide segments, a tapered end of one waveguide segment overlaps an adjacent tapered end of the other waveguide segment.

In any of the waveguide fabrication method embodiments, the tapers can be selected from the shaped and profiled taper embodiments described above with respect to FIGS. 12–33.

In another embodiment, a waveguide 30 comprises a plurality of waveguide segments, each of the plurality of waveguide segments comprising a tapered end and being adjacent to at least one other of the plurality of waveguide segments. Numerous more specific waveguide embodiments include tapers selected from the shaped and profiled taper embodiments described above with respect to FIGS. 12–33.

The previously described embodiments of the present invention can be used in various combinations and have many advantages, including, as one example, the potential for achieving submicron tolerances by breaking the waveguide into a family of graphics primitives that are printed to photocompose a completed waveguide that is adapted to actual device locations in an HDI (high density interconnect) photonic device.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for adaptively fabricating a waveguide comprising:
   (a) measuring misplacement of a photonic device relative to a substrate;
   (b) generating computer readable instructions for using a plurality of graphics primitives to form the waveguide;
   (c) photocomposing the waveguide on the substrate in accordance with the computer readable instructions.

2. The method of claim 1 wherein (a) comprises representing an actual position of the photonic device by a translational error.

3. The method of claim 2 where (b) comprises generating computer readable instructions to compensate for the translational error.

4. The method of claim 2 wherein (a) comprises representing an actual position of an aperture of the photonic device by the translational error.

5. The method of claim 1 wherein (a) comprises representing an actual position of the photonic device by a rotational error and a translational error, and wherein (b) comprises generating computer readable instructions to compensate for the rotational and translational errors.

6. The method of claim 1 further comprising, prior to (a), forming markings on the substrate, wherein (a) comprises measuring the photonic device relative to the markings.

7. The method of claim 1, wherein (b) comprises generating computer readable instructions identifying a reticle, and wherein (c) comprises using the reticle.

8. The method of claim 7 wherein (b) comprises determining optimal graphics primitives and using the optimal graphics primitives for identifying the reticle.

9. The method of claim 7 wherein (b) comprises generating the computer readable instructions for using the plurality of graphics primitives to form a waveguide having profiled end points, and wherein using the reticle comprises using a grayscale reticle.

10. The method of claim 7 wherein (c) comprises using a wafer stepper.

11. The method of claim 10 wherein (c) comprises maintaining the reticle in a stationary position and using the wafer stepper for moving the substrate.

12. The method of claim 10 wherein (c) comprises providing a photoresist over the waveguide, exposing the photoresist to light through the reticle, and using the photoresist to pattern the waveguide.

13. The method of claim 12 wherein (c) further comprises using the photoresist to pattern the waveguide by dry etching the photoresist and waveguide.

14. The method of claim 12 wherein (c) further comprises providing a metallization layer between the waveguide and the photoresist, and, after exposing the photoresist to light through the reticle, wet etching the metallization layer, dry etching the waveguide through the etched metallization layer, and removing the etched metallization layer.

15. The method of claim 10 wherein (c) comprises photocomposing the waveguide by exposing the waveguide to light through the reticle.

16. The method of claim 1 further comprising, prior to (a), providing a substantially flat substrate.

17. The method of claim 16 further comprising, prior to (a), positioning a photonic device comprising a vertical cavity surface emitting laser (VCSEL).

18. The method of claim 17 further comprising, after (a) and before (c), providing a microlens over the VCSEL.

19. The method of claim 1 wherein (a) comprises measuring misplacements of photonic devices comprising a VCSEL and a photodetector.

20. The method of claim 19 wherein (b) comprises generating computer readable instructions for fabricating a substantially straight waveguide.

21. The method of claim 19 wherein (b) comprises generating computer readable instructions for fabricating a waveguide comprising an adapted portion.

22. The method of claim 21 wherein (b) comprises generating computer readable instructions for fabricating a waveguide comprising two substantially straight portions coupled by the adapted portion.

23. The method of claim 1 wherein (a) comprises representing an actual position of the photonic device by translational error, wherein (b) comprises generating computer readable instructions to compensate for the translational error, and wherein (b) comprises generating computer readable instructions for fabricating a waveguide comprising an adapted portion and two substantially straight portions coupled by the adapted portion.

24. The method of claim 23 wherein (b) comprises generating computer readable instructions for fabricating a stretch region in one of the substantially straight portions.

25. The method of claim 23 wherein the adapted portion comprises a straight stretch region and a translation bend region.

26. The method of claim 25 wherein the translation bend region is offset in both the X and Y directions.

27. A computer-readable medium storing computer commands for commanding a computer system to formulate computer readable instructions for using a plurality of graphics primitives to form a waveguide, the computer commands comprising:
  (a) accessing an align file comprising data describing an actual position of a photonic device on a substrate;
  (b) accessing a CAD flash file comprising data describing an ideal placement of graphics primitives on the substrate;
  (c) accessing a reticle index comprising a plurality of reticle files, each reticle file comprising a list of available graphics primitives on a respective reticle;
  (d) accessing an adaption type file comprising data on reticle overlapping for positional offset error of the photonic device; and
  (e) using the align file, the CAD flash file, reticle index, and the adaption type file to provide computer readable instructions for (i) selecting a reticle and (ii) controlling a wafer stepper supporting the reticle and a light source positioned opposite the reticle for supplying light through the reticle to the substrate.

28. The medium of claim 27 wherein (e) (ii) comprises specifying wafer stepper exposure locations.

29. The medium of claim 28 wherein (e) (ii) comprises specifying reticles to be used in wafer stepper passes.

30. The medium of claim 29 wherein (e) (iii) comprises specifying exposure parameters for each of a plurality of waveguide segments.

31. The medium of claim 30 wherein the exposure parameters comprise positional coordinates and reticle opening offset.

32. The medium of claim 31 wherein the exposure parameters further comprise exposure and focus.

33. A method for fabricating a waveguide comprising:
  selecting a reticle comprising a plurality of graphics primitives, at least one of the plurality of graphics primitives comprising a tapered end;
  using computer readable instructions for photocomposing the waveguide through selected graphics primitives of the reticle,
  the computer readable instructions comprising instructions designed to ensure that, for each of at least some pairs of adjacent photocomposed waveguide segments, at least one tapered end of one waveguide segment overlaps an adjacent end of the other waveguide segment.

34. The method of claim 33 wherein the computer readable instructions comprise instructions designed to ensure that, for each of at least some pairs of adjacent photocomposed waveguide segments, a tapered end of one waveguide segment overlaps an adjacent tapered end of the other waveguide segment.

35. The method of claim 33 wherein a taper of the at least one tapered end comprises a shaped taper.

36. The method of claim 35 wherein the shaped taper is a widened taper or a narrowed taper.

37. The method of claim 35 wherein the shaped taper comprises a rounded taper.

38. The reticle of claim 35 wherein the shaped taper comprises an angled taper.

39. The method of claim 33 wherein a taper of the at least one tapered end comprises a profiled taper.

40. The method of claim 39 wherein the profiled taper comprises a shaped and profiled taper.

* * * * *